Nov. 6, 1962  F. W. R. STARP  3,062,118
ONE-EYE MIRROR-TYPE REFLEX CAMERA HAVING INTRA-LENS SHUTTER
Filed Jan. 28, 1960  2 Sheets-Sheet 1
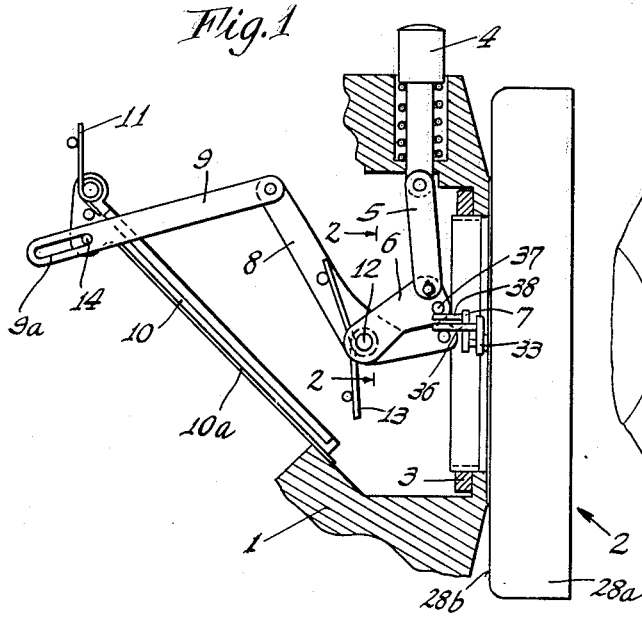
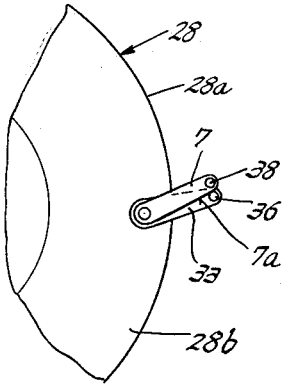
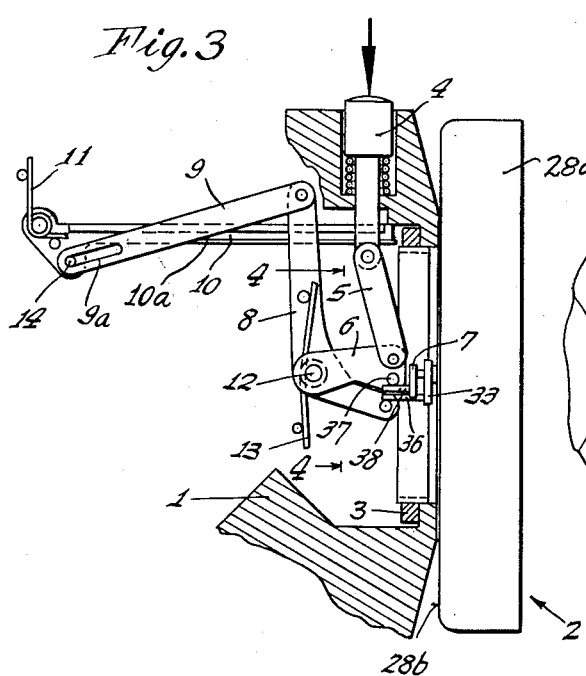
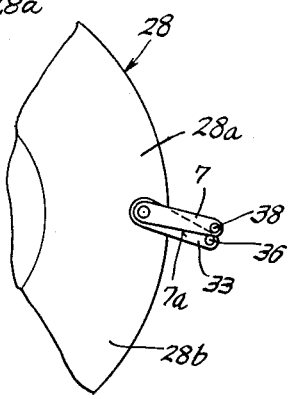
INVENTOR.
Franz Wilhelm Reinhard Starp
BY
Munn, Liddy, Daniels & March
ATTORNEYS Nov. 6, 1962   F. W. R. STARP   3,062,118
ONE-EYE MIRROR-TYPE REFLEX CAMERA HAVING INTRA-LENS SHUTTER
Filed Jan. 28, 1960   2 Sheets-Sheet 2
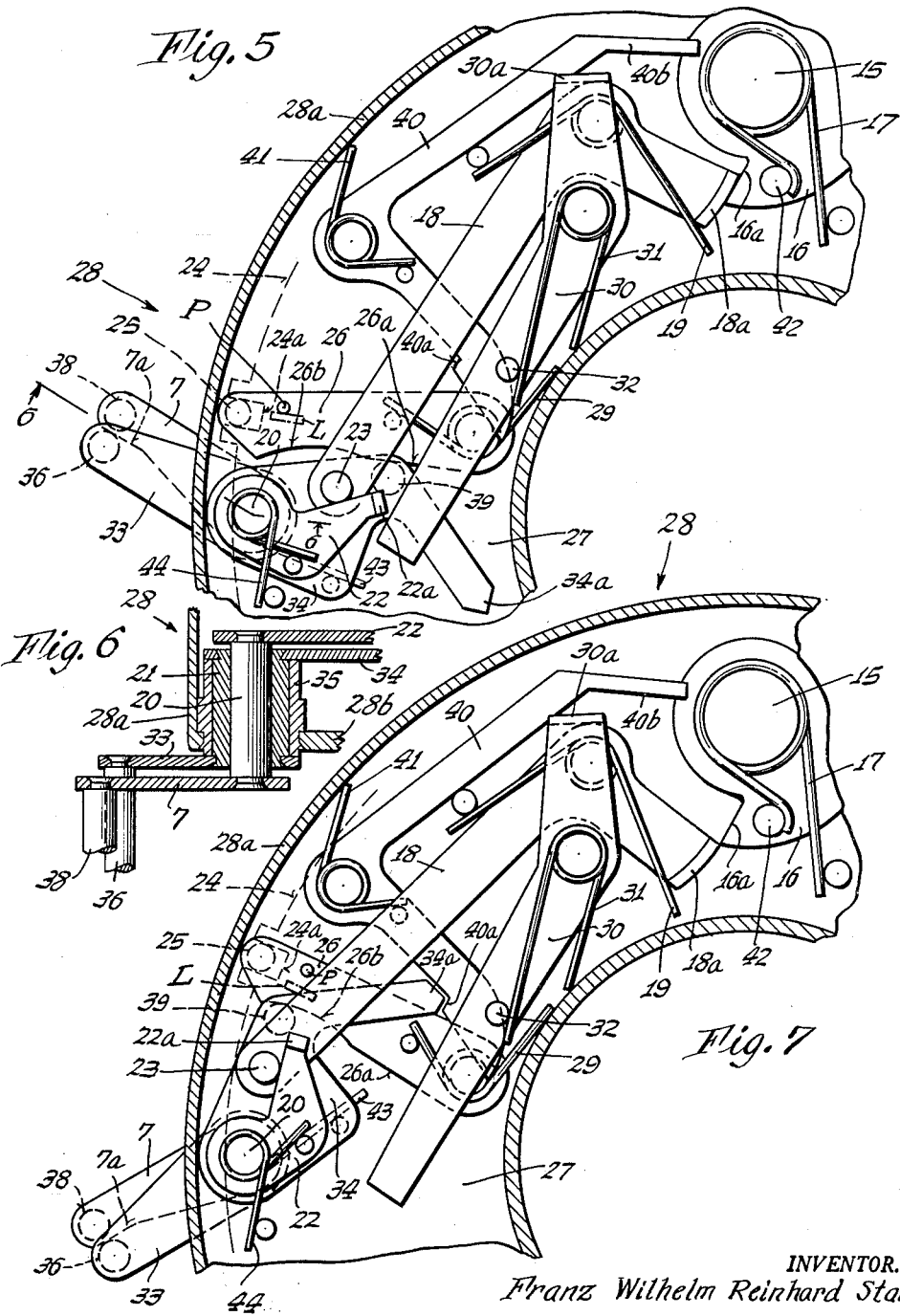
INVENTOR.
*Franz Wilhelm Reinhard Starp*
BY
*Munn, Liddy, Daniels & March*
ATTORNEYS 3,062,118
ONE-EYE MIRROR-TYPE REFLEX CAMERA
HAVING INTRA-LENS SHUTTER
Franz Wilhelm Reinhard Starp, Calmbach (Enz), Germany, assignor to Alfred Gauthier G.m.b.H., Calmbach (Enz), Germany, a corporation of Germany
Filed Jan. 28, 1960, Ser. No. 5,134
Claims priority, application Germany Jan. 30, 1959
5 Claims. (Cl. 95—42)

This invention relates to one-eye reflex cameras of the type having intra-lens shutters and wherein actuation of the camera release directly effects the closing of the shutter blades which were normally open for viewing purposes, also effects shifting of the finder mirror out of its viewing position, and further effects release of the shutter for the purpose of taking the photograph.

One-eye reflex cameras of the above type are generally characterized by a simple, functionally reliable structure and operation, involving relatively few, economically producible parts. In addition, they also have the advantage that the camera is always "seeing," that is, in a condition to permit viewing of the subject which is to be photographed. With such cameras, after the camera release has been relieved of the finger pressure or actuating force, the finder mirror is automatically returned to its viewing position and the shutter blades are restored to their open positions so that the photographer is again able to see the photographed object through the camera immediately after having taken the picture. However, with well-known cameras of this type there is the disadvantage that they are not capable of either "B" setting exposures or exposures involving appreciable time intervals, as well as exposures involving a built-in delayed action device, all in an operationally simple and reliable manner.

An object of the present invention is to provide an improved one-eye reflex camera of the above described kind, which is not subject to the defects and drawbacks mentioned above.

This is accomplished, in accordance with the invention, by the provision of a novel and unique type of operating mechanism which is connected with and responsive to movement of the camera release, said mechanism effecting the conditioning of the camera for the exposure and being characterized by tensionally unidirectionally positive connections which are operable between the camera release and a number of actuating devices for effecting the opening of the shutter blades for viewing purposes, the pivoting of the finder mirror and, if desired, the operation of a viewing window cover flap and adjustment of a preselection diaphragm, all in conjunction with releasable locking means arranged to hold the said actuating devices in their shifted positions until after the exposure has been effected.

In the improved one-eye reflex camera as provided by the invention the advantages of the above-mentioned tensional and unidirectionally positive connections in conjunction with the releasable locking means include the important feature that "B" exposures, time-exposures and also exposures involving a built-in delayed action device may be effected in a manner as favorable as with well-known cameras which are not of the reflex type. With the present improved construction, in the case of "B" exposures the shutter may remain open for the purpose of the exposure as long as the camera release is held depressed; also, in the case of time exposures and exposures involving the delayed action device which is built into the shutter, the camera release can be relieved of finger pressure immediately after being actuated, without causing the reflex viewing mechanism to return to its operative position or causing the preselection diaphragm to be disturbed from its adjusted position, which actions would defeat the taking of the picture. With the present organization, in accordance with the invention, the return of the viewing devices and shifting of the pre-selection diaphragm to its fully open position is initiated only after the exposure has been completed.

A one-eye reflex camera constructed in accordance with the invention does not only have the aforementioned advantages with respect to the structures utilized and to observation of the object which is to be photographed, but also is characterized by an unlimited range of use, embracing all kinds of exposures while at the same time insuring a maximum degree of operational simplicity and reliability.

An advantageous and especially simple organization involving relatively few components is possible by arranging the shutter, mirror and diaphragm actuating or control devices in such a way that these are actuated by a single transmission means which may be operably connected to the camera release.

For the purpose of obtaining a reliable synchronization of the movements of the shutter release and the transmission means in response to actuation of the camera release, it is of further advantage to operate the transmission means by a driver or driving portion of the shutter release device which, in turn, is connected to the camera release.

By arranging the shutter release device and the transmission means so that these are coaxially disposed, there is had an arrangement whereby relative adjustment between these two members may be readily carried out.

In accordance with the invention a simple and reliable releasable locking device or means is associated with the transmission means or member for the purpose of retaining the aforementioned actuating devices in the shifted positions attained in conditioning the camera for the actual exposure, said locking means being preferably disposed on or in the intra-lens shutter housing. By such organization only relatively few, simple structural members are required, and there is effected an economy as regards the assembly of the components while at the same time a high functional reliability is had.

The invention also provides, as set forth in the illustrated embodiment, a construction which provides positive assurance that the finder mirror and, when used, the cover flap for the viewing window, together with the diaphragm and the auxiliary shutter actuating device will all remain in their proper positions to enable an exposure to be made, until such time as the exposure has been completed. This is effected by arranging a member of the shutter driving mechanism, as for example the main driving member or disk of the shutter, so that it operates to release the releasable locking means in the last phase of movement of the said member, where the exposure is no longer occurring.

In the following specification and the accompanying drawings there is described and illustrated an embodiment of the invention.

FIG. 1 is a view partly in side elevation and partly in vertical section, illustrating a camera construction employing a transmission means or member connected with the shutter release and the camera release as provided by the invention and further connected to an actuating device for the pivotally mounted finder mirror. The camera release is in its rest position, and the finder mirror is in the viewing position.

FIG. 2 is a fragmentary elevational view as seen from the inside of the camera case, looking in the direction of the arrows 2—2 of FIG. 1.

FIG. 3 is a view like FIG. 1 but showing the camera release as being depressed and the finder mirror as swung to its inoperative position, out of the path of the light rays which effect the exposure.

FIG. 4 is a fragmentary inside elevational view similar to that of FIG. 2, looking in the direction of the arrows 4—4 of FIG. 3.

FIG. 5 is an enlarged interior view of the intra-lens shutter assemblage, partly in vertical section and partly in elevation, showing parts of a preferred unique operating mechanism made in accordance with the invention. Interior components of the shutter assemblage are shown in elevation and include the releasable locking means provided for the transmission member, which latter is also illustrated in FIGS. 1-4. The locking means is in the inoperative position and the transmission member and shutter release occupy their positions of rest. The shutter is set or cocked.

FIG. 6 is a fragmentary sectional view through the shutter assemblage of FIG. 5, taken on the line 6—6 thereof. The shutter release lever and the transmission member, also constituted as a lever, are shown as having a common axis.

FIG. 7 is a view like FIG. 5, but showing the releasable locking means in its operative position with the shutter driving member at the point of release.

Referring first to FIGS. 1-4, the housing or case of the one-eye reflex camera is indicated by the numeral 1. Carried by the camera case 1 is an intra-lens shutter assemblage 2, secured in place in the usual manner as by a threaded fastening ring 3. The camera has a camera release in the form of a depressible knob 4 connected with a link or push rod 5, the latter being pivotally connected with a lever 6 located in and pivotally on the camera case 1. The lever 6 is arranged to actuate the shutter release lever 7 of the intra-lens shutter assembly 2, in a manner hereinafter disclosed in detail.

Coaxial with the lever 6 is a second lever 8 which is connected, through the medium of a connecting rod 9, with the finder mirror 10. A spring 11 normally biases the mirror 10 clockwise as viewed in FIGS. 1 and 3, the said spring tending to hold the mirror in the viewing position of FIG. 1. Another spring 13 carried by the bearing pin 12 for the levers 6 and 8 tends to keep the lever 8 and connecting rod 9 in the position indicated in FIG 1. The connection between the connecting rod 9 and the mirror 10 is of the pin-and-slot type, comprising a pin 14 rigid with the mirror 10 and a slot 9a in the connecting rod 9. With this organization, when the lever 8 is pivoted in a clockwise direction it will shift the connecting rod 9 from left to right. Because of the slotted connection this will at first not move the mirror 10, but instead only the position of the pin 14 in the slot 9a will be changed. When the rod 9 has moved to an extent equal to the length of the slot 9a, the pin 14 will be disposed at the left end of the slot, and upon this occurring further clockwise movement of the lever 8 will shift the mirror 10 counterclockwise to a position where it is no longer disposed in the path of the light rays. Such end position of the mirror 10 is illustrated in FIG. 2, and as clearly shown in this figure the mirror no longer obstructs to any extent the light which might pass through the shutter assembly 2 into the camera case 1 for exposing the film.

In addition to actuating the mirror 10, the lever 8 may also pivot a viewing window cover flap which is mounted to be either coaxial with the mirror or else on a different axis located out of the path of the light rays which are intended to pass through the intra-lens shutter assembly 2. Such viewing window cover flaps are known per se, and one simple type having a mounting which is coaxial with the mirror 10 is illustrated in FIGS. 1 and 3. This viewing window cover flap is designated 10a, and comprises a somewhat yieldable and soft thin sheet which is secured to and carried by the back of the mirror 10. The cover flap 10a may, for example, be constituted of a rubber or rubber-like composition. The purpose of the cover flap 10a consists in effecting, either alone or in conjunction with the mirror 10, a light proof covering for the viewing window so as to exclude all light from the film when the shutter blades are opened for the purpose of observing the object to be photographed in the viewer or finder.

The flap 10a may be pivoted out of the ray path at the same time as or before actuation of the viewing mirror. As shown herein, the flap is pivoted simultaneously with the mirror. To pivot it prior to actuation of the mirror it must, of course, be constituted of a separate member and must be independently movable with respect to the mirror. Such specific arrangement where the flap is separately movable is not illustrated herein in detail since it is well within the ability of one skilled in the art to construct. The invention provides a mode of operation wherein, prior to actuating the light-tight cover effected by the mirror 10 and, when provided, the cover flap 10a, the shutter blades, which were open for the purpose of utilizing the view finder, are actuated so as to be completely closed. As will be described later, the closing of the shutter blades is effected, in the illustrated embodiment of the invention, in that phase of the movement of the lever 8 where the connecting rod 9 is moved without shifting the mirror 10 or the viewing window cover flap 10a, this being made possible by the slot 9a.

When the mirror 10 and, where provided, the cover flap 10a are in the position shown in FIG. 3, they serve the purpose of shielding the interior of the camera against light which might come through the intra-lens shutter assemblage 2.

The structure of the intra-lens shutter assemblage 2 which is mounted on the camera case 1 is of a well known kind. Referring to FIGS. 5 and 7, the shutter assemblage includes a main drive member in the form of a driving disc 16 pivotally mounted about an axle 15 and powered by a spring 17. The driving spring 17 is tensioned or cocked in a well known manner (not shown for sake of clarity of illustration) by means of a shaft which projects from the rear of the shutter assemblage and which is preferably connected with the film transport device of the camera. The shutter drive may thus be set or cocked at the same time that the film is advanced. The well known shutter blades and their driving connections to the driving disc 16 are not shown for clarity's sake and since the invention is not especially concerned with them. The said driving connections may be established in a notoriously well known manner, as for example by the use of a known driving pawl or link which is pivotally connected with the driving disc 16, said link cooperating with a driver pin on a shutter blade ring which is arranged to be concentric with respect to the shutter axis. The opening and closing of the shutter blades during the effecting of the exposure is accomplished by a reciprocation of the link and the blade driving ring, this being the result of continued clockwise turning movement of the driving disc 16 and accompanying compound movement of the driving pawl or link, which latter has a movement similar to a connecting rod which is being driven by a crank pin. In this instance the driving pin on the driving disc 16 would constitute the crank pin.

FIG. 5 shows the position of the driving disc 16 of the shutter assemblage when the disc is cocked or set. The disc 16 is secured in its cocked position by a lever 18 having a lug 18a which abuts a shoulder 16a of the disc. The lever 18 is biased counterclockwise by a spring 19 as shown, whereby it tends to remain in the disc abutting position of FIG. 5.

The shutter release lever 7 is arranged to actuate the disc control lever 18, thereby to effect a release of the shutter blade drive. The lever 7 is riveted to one end of a shaft 20 which is turnably mounted in a turnable bushing 21 extending into the interior of the shutter housing. The arrangement of the bushing 21 will be described later. As seen in FIG. 6, a lever 22 is affixed to the other end of the shaft 20 and is cooperable with a pin 23 fixedly carried by the lever 18. When the release lever 7 is pivoted in a counterclockwise direction (see FIGS. 5 and 7) or downward as viewed in FIGS. 1–4, the lever 18 is driven clockwise by virtue of driving force imparted to the pin 23, and the shutter driving disc 16 is released. FIG. 7 shows the precise moment at which release of the driving disc 16 takes place.

The intra-lens shutter assemblage 2 is further equipped with a well known (and hence not shown in detail) auxiliary device for opening and closing the shutter independently of the driving disc 16. Such independent or auxiliary shutter opening and closing device is illustrated and described in detail, for example, in U.S. Patent No. 2,168,893 and printed German application D 17,219 IX/57a, published December 27, 1956. This auxiliary shutter opening and actuating device serves the purpose of opening the shutter to permit the light rays from the object to be photographed to pass through the intra-lens shutter assemblage 2 and to strike the viewing mirror 10 to enable the user of the camera to observe the object. Also, such auxiliary shutter actuating device is operated to reclose the shutter blades prior to the effecting of the actual exposure and prior to removing the light-tight covering from the path of the light rays, as represented by the mirror 10, where provided, the cover flap 10a. In FIGS. 5 and 7 a well known ring 24 is illustrated, the said ring constituting a part of the auxiliary shutter opening and closing device. The ring 24 is arranged concentrically with respect to the axis of the shutter assemblage, and carries one set of bearing points (not shown) of the shutter blades whereas the remaining set of bearing points of the blades are carried by the regular shutter blade driving ring (also not shown) which is connected to and driven by the shutter driving disc 16. Such construction involving the two sets of shutter blade bearing points in an organization where one set or the other set remains stationary while the remaining set is actuated, thereby to effect operation of the shutter blades by two separate devices, is well known in the art and requires no further description herein. It will be understood that the directions of opening and closing movements of the auxiliary shutter actuating ring 24 and the exposure-effecting shutter actuating ring (not shown) are opposite to each other, and in the illustrated shutter structure the blade driving ring which is to be powered by the driving disc 16 would move in a clockwise direction (FIGS. 5 and 7) to effect opening of the shutter blades whereas the auxiliary blade actuating ring 54 is shifted in a counter-clockwise direction to effect opening of the shutter blades. The auxiliary shutter blade ring 24 has on its circumference a rectangular slot or recess 24a (FIGS. 5 and 7) which is engaged by a driver pin 25 fixedly carried by a lever 26. The lever 26 is pivotally mounted on the shutter base plate 27, as is the case with the lever 18 described above and also the shutter driving disc 16. The shutter base plate 27 is mounted within the shutter housing 28 in a manner known per se. 28a represents the side wall of the housing 28, and 28b is the rear housing wall.

The lever 26 is acted on by a spring 29 which biases it counterclockwise and tends to hold the lever in a position corresponding to the open position of the shutter blades, as effected by the auxiliary actuator ring 24. Moving the lever 26 clockwise causes a clockwise turning of the auxiliary actuator ring 24 and a closing of the shutter blades, the said blades being normally held open for the purpose of viewing through the finder, under the action of the spring 29.

The intra-lens shutter assemblage or objective of the camera may further comprise a pre-selection diaphragm which is well known in reflex cameras. The drawings do not show details of such a pre-selection diaphragm for reasons of clarity, but illustrate a lug L such as would be carried by a spring charged diaphragm actuator ring, said lug being engageable with a pin P carried by the arm 26 and being held in engagement therewith by the said charging spring except when the diaphragm actuator ring is intercepted by a light-responsive abutment controlled by a light-intensity control or galvanometer. Diaphragms of this type are usually influenced by such a spring which normally urges them into closing position.

For the purpose of enabling the user to utilize the view finder, the diaphragm can be opened to the full extent, and is returned to a pre-selected setting before the exposure is to be made. The diaphragm value can be automatically preselected, as stated above, by means of a well-known spring charged setting ring provided with the lug L, or in a manner known per se, in response to the operation of the mentioned light intensity measuring or control device. The opening of the diaphragm to its greatest aperture and the release of the diaphragm to close to its pre-selected or automatically chosen value can be effected either in response to the movement of the lever 8 or, as shown herein, in response to the movement of the lever 26 by means of the pin P and lug L. The connection P, L between the diaphragm and the said lever 26 is arranged as a unidirectionally positive spring maintained connection, so that during the closing operation the diaphragm elastically follows the lever until the diaphragm halting member or abutment halts further movement in consequence of impingement of a stepped edge of the diaphragm mechanism with the abutment which is set either by pre-selection or else automatically by the light-intensity measuring device.

Finally, a device for "B" exposures is built into the lens shutter shown in FIGS. 5 and 7. The said B-exposure device is associated with a lever 30 positioned on the shutter base plate 27 and urged in a clockwise direction by a spring 31. The lever 30 has on its short arm a downwardly bent tab 30a which can be shifted into the path of movement of the shoulder 16a of the driving disc by the action of the spring 31. When the shoulder 16a strikes the tab 30a, the driving disc 16 will occupy a position corresponding to the fully-open condition of the shutter blades. However, the lever 30 can be pivoted into operable relationship with the driving disc 16 only if a well known exposure time setting ring (not shown for clarity's sake) is placed in the B-setting position. The said exposure time setting ring may have a suitable cam (as is well known) to effect the B-setting and may further have additional cams for a well known exposure time escapement mechanism (not shown) which cooperates in a known manner with the shutter driving disc 16. Thus, in all setting positions of the exposure time setting ring which are different from the B-position the lever 30 is blocked and prevented from moving to the position wherein it is cooperable with the driving disc 16, whereas for the B-setting position it is free to pivotally move clockwise so as to halt the driving disc 16 with the shutter blades open. The cooperation between the lever 30 and the exposure time setting ring is effected by means of a pin 32 which is fixedly mounted on the lever and is disposed adjacent the B-cam, being biased for engagement with the same under the action of the spring 31. In addition, the lever 30 cooperates with the shutter release lever 7 in a manner known per se so that the latter when not being operated, locks the lever 30 in the position shown in FIG. 5. If the shutter is to be actuated and the exposure time setting ring is placed in the B-position the lever 30 will be able to follow the release lever 7 and thereby occupy the above described locking position wherein it is cooperable with the driving disc 16 to halt the latter with the shutter blades open. The cooperation between the shutter release lever 7 and the B lever 30 is effected by means of a tab 22a on the lever 22, arranged for engagement by the lever 30, as may be readily seen in FIG. 5.

In accordance with the invention, the camera release button 4 can be positively connected to the following actuating members or devices:

(A) The auxiliary shutter actuating device 24, 25, 26 for opening and closing the shutter blades apart from the operation of the same for effecting an exposure.

(B) The actuating device 8, 9 for pivoting the finder mirror.

(C) The actuating device for controlling the movement of the pre-selection diaphragm.

(D) The actuating device for pivoting the viewing window cover flap (when such actuating device is at least in part separate from the actuating device for the finder mirror.

In addition to the above, locking or detent devices are provided to retain the said actuating devices in their retracted positions (in readiness for the actual exposure, see FIG. 3) into which they were moved in response to the actuation of the camera release button 4, such retention being effective until the exposure has been completed.

As has already been stated above, the invention provides a one-eye reflex camera wherein B-exposure photographs can be taken just as with well known cameras which are not of the reflex type, these B-exposures being effected merely by maintaining depressed the camera release button corresponding to the length of the desired exposure time; also, on the other hand it is possible to take photographs, as with well known cameras which are not of the reflex type, utilizing long exposure times as for example ⅕ sec. and longer, and also photographs utilizing a built-in well known delayed action device in an arrangement where the camera release button 4 may be quickly relieved of finger pressure after having been initially actuated. That is, the operator can let go of the release button 4 immediately after the releasing operation has been initiated.

The invention thus results in an important advantage being had, in that the operator is able to let go of the camera release when taking the last described type of photograph, without disturbing or changing the running off of the shutter drive or the progress of the exposure.

The delayed action device is not shown in the figures since the invention does not relate to this mechanism as such, and since the construction of such delayed action devices and their cooperation with the releasing and driving means of a shutter are notoriously well known in the art.

An especially advantageous construction as provided by the invention and shown in the figures, is had when the above listed actuating devices are made responsive to a single transmission member which is connected to the camera release button 4 for actuation thereby. In the illustrated embodiment of the invention, the said transmission member is constituted and arranged in a manner similar to the shutter release. It comprises the following members: A lever 33 disposed at the rear of the intra-lens shutter assemblage 2, the previously mentioned bushing 21, and a lever 34 disposed in the interior of the shutter housing. The two levers 33, 34 are rotatably drivingly connected to the bushing 21, and the said bushing is, in turn, rotatably mounted in an outer bushing or bearing 35 which is riveted to the bottom wall 28b of the shutter housing. This arrangement is clearly illustrated in FIG. 6 of the drawings, and it may be seen that the transmission member 33, 21, 34 is thus coaxial with the shutter release 7, 20, 22. Such organization provides for simplicity of the mechanism, is compact and saving of space, and is further favorable to the adjustment and reliable operation of the entire mechanism.

The cooperation between the camera release button 4 and the transmission member 33, 21, 34 is effected by a pin 36 fixedly mounted on the lever 33, the said pin being engageable with an edge 7a of the shutter release lever 7. The connection between the release button 4 and the shutter release lever 7 is established by way of the above mentioned members 5 and 6, and a pin 37 fixedly mounted on the lever 6 and cooperating with a pin 38 fixedly provided on the shutter release lever 7.

The transmission member 33, 34, 21 is thus effective in accomplishing actuation of the above listed actuating devices for causing retraction of the mirror 10 and, where provided, the viewing window cover flap 10a, and release of the preselection diaphragm. In addition, the auxiliary device for effecting opening and closing of the shutter blades independently of the powered shutter drive mechanism is actuated by means of a pin 39 fixedly mounted on the lever 34 and arranged to cooperate with the lever 26 in a manner which is apparent from an inspection of FIGS. 5 and 7. For this purpose, the edge of the lever 26 is constituted as a cam 26a, 26b and the cooperation between the pin 39 and the cam 26a of the cam lever 26 opens and closes the shutter blades, while the presence of the pin 39 on the cam 26b does not influence the lever 26 whereby the shutter blades may be readily maintained in their opened state to permit viewing through the finder.

It is also seen in the illustrated embodiment of the invention that the above listed actuating devices may be secured or retained in the positions required immediately prior to the making of the exposure, utilizing the fewest possible components in simple assemblies wherein adjustment requirements are kept at a minimum. FIGURES 5 and 7 show how a single releasable locking or detent device associated with the transmission member 33, 21, 34 serves to lock the various actuating devices, said detent device being disposed within the intra-lens shutter housing.

The said locking device comprises a special arm 34a provided on the lever 34 and having a lug-shaped end portion. The said end portion serves to block the transmission member 33, 34 in the release position shown in FIG. 7. The releasable locking means cooperable with the arm 34a comprises a bell crank 40 which is pivotally mounted on the base plate 27 of the shutter assemblage and is biased clockwise by a spring 41. The short arm of the lever 40 has on angularly extending shoulder 40a adapted to engage the arm 34a of the transmission member 33, 21, 34 in the manner indicated in FIG. 7.

In FIG. 7 all of the actuating devices are shown in their locked positions, in readiness for the making of an exposure.

In accordance with the invention, the detent locking or device which retains the transmission member 33, 21, 34 in the position of FIG. 7 is released only after the effecting of the exposure, when any movement of the listed actuating devices are no longer able to interfere with such exposure. As shown in the figures illustrating the embodiment of the invention, this result is attained reliably and in a manner which requires no additional expenditure, in that a member of the shutter driving mechanism, specifically the driving disc 16 of the shutter, serves to effect release of the detent device 34a, 40a, and in that such release is effected in the last phase of movement of the driving disc 16, during which the exposure has already been completed and no adverse effect may be had thereon.

This last phase of movement of the shutter driving disc 16, wherein the exposure may no longer be influenced, starts at the moment when the shutter blades have been completely closed after being opened to effect the exposure. The said phase ends when the shutter blades have reached their fully inoperative position. This last point corresponds to the inoperative or idle position of the shutter driving disc 16 itself.

A pin 42 which is affixed to the driving disc 16 and which is engaged by the driving spring serves to actuate the locking lever 40 for the purpose of effecting actuation of such lever. Upon the driving disc 16 reaching the starting point of the above mentioned end phase of movement, wherein the exposure has already been completed, the pin 42 strikes the edge 40b of the long arm of the lever 40 and pivots the latter counterclockwise. During the termination of the movement of the driving disc 16 the said counterclockwise movement of the lever 40 is sufficient to release the detent device 34a, 40a. Due to the action of the various springs involved, the listed actuating devices are then able to return to their positions required for rendering the viewing device of the camera operative.

Instead of releasing the detent device 34a in response to turning of the shutter driving disc 16, the detent device may be actuated and released by other members of the shutter driving mechanism, as for example by means of the shutter blade driving ring (not shown). However, the release as effected by the driving disc 16 as shown in the figures may be considered as an optimum solution, as regards simplicity of structure, economy and functional reliability.

The cooperation between the shutter release 7 and the transmission member 33, 21, 34 may, in each case, be adapted to the particular features of the camera or shutter assemblage. More particularly the coaxial arrangement of the two members 7 and 33 may be replaced by a non-coaxial arrangement, and in addition the levers 7, 33 which are disposed outside of the shutter housing 28 may be replaced, for example, by two end portions of levers disposed within the housing, said end portions projecting from the rear wall 28b of the housing and extending parallel to the optical axis of the shutter assemblage.

It is essential, for purposes of the invention, that a positive unidirectional-acting connection exist between the camera release button 4 and the various actuating devices above listed, and that releasable detent or locking devices are provided which insure retention of the actuating devices in their retracted positions (in readiness for effecting the exposure) after initiation of the exposure operation has been effected and prior to the actual exposure being made, such actuating devices being held inoperative until complete termination of the actual exposure of the film.

In order to clearly set forth the advantages resulting from the structure as provided by the invention, the mode of operation of the camera as shown in the illustrated embodiment will now be described. It will be assumed that the camera is in the viewing condition as illustrated in FIGS. 1, 2 and 5, and that the intra-lens shutter assemblage is in cocked condition, wherein the individual components and means in FIG. 5 occupy the positions indicated.

1. *The Taking of Photographs Where It Is Desired To Employ Any Exposure Time Setting, Especially Exposure Times of Appreciable Length*

Depressing the camera release button 4 in the direction of the arrow shown in FIG. 3 initiates a pivotal movement of the shutter release member 7. However, this initial movement does not bring about the release of the shutter as yet. Instead in this first phase of movement, the previously opened shutter blades (as effected by the blade ring 24) are closed by means of the movement of the lever 26 actuating the ring 24. The closing of the shutter blades is completed when the pin 39 on the arm 34 reaches the beginning of the arcuate cam surface 26b, after having traversed the cam surface 26a.

After the shutter blades have been thus closed, further movement of the camera release button 4 causes the mirror 10, and (when provided) the viewing window cover flap 10a to be pivoted out of the path of light which may come through the intra-lens shutter 2. Owing to the cooperation of the pin 39 with the cam surface 26b of the lever 26, the shutter blades are secured in their closed positions during this shifting of the blade ring 24.

Simultaneously with the above-mentioned operations the previously opened objective diaphragm will have been released for actuation under the action of its spring to a selected setting as determined by a stop. The closed position corresponds to the diaphragm value which is suitable for the photograph which is to be taken, as has already been stated above. The said stop may be arranged, for example, on a pre-selection ring, or the stop may be formed of a contact or feeler member of an exposure meter. With the mirror 10 positioned out of the way, as shown in FIG. 3, together with the viewing window cover flap 10a, the lever 34 of the transmission member is locked by engagement with the shoulder 40a of the lever 40. This secures or locks all of the actuting devices against any return movement to their operative positions corresponding to the viewing state.

At the moment when the securing or detent device 34a, 40a becomes operative the adjustment or relative positions of the various components in the overall arrangement has not yet caused a release of the shutter blades. Such release takes place only when the camera release button 4 is shifted by a small additional distance. In the course of movement of the button through this small distance, the member 22 of the shutter release pivots the lever 18 finally to the extent where it occupies the position shown in FIG. 7, and in so doing the member 22 causes the lever 18 to release the driving disc 16 of the shutter. The spring 17 now becomes operative to place the driving disc in motion.

Depending on the exposure time which the camera has been set for, i.e. depending on whether a well known escapement mechanism becomes more or less effective in retarding the shutter movement, the driving disc will be allowed to run down clockwise to open the shutter blades and thereafter again close the same.

However, independently of the length of the exposure time which is set, the operator may remove his finger from the camera release button 4 immediately after the condition shown in FIG. 7 has been attained, without thereby disturbing in the least the running down time of the driving disc 16, i.e., the length of the exposure. This is due to the fact that all of the actuating devices are locked against a return movement to their viewing positions until the driving disc 16 has completed its shutter driving movement and finally pivots the lever 40 in the last phase of its movement, i.e., the phase wherein the exposure has already been completed and the aperture is again closed. Such pivoting of the lever 40 will now release the securing device 34a, 40a whereupon the listed actuating devices will be enabled to return to their starting positions due to the action of the various driving springs associated with them, i.e., the springs 13 and 11 for the mirror and the viewing window covering flap, the spring 29 for the shutter blades as well as the spring 43 associated with the transmission member, for the diaphragm, such spring acting on the transmission member 34. It is assumed with respect to the diaphgram that the spring 43 acting on the transmission member 34 is stronger than the spring (not shown) usually provided for moving the diaphragm into its closed position.

It is to be further noted that, instead of a tensional, unidirectional positive connection between the lever 33 of the transmission member and the lever 8, a cooperable interfitting connection can be used which absolutely and positively insures that the mirror 10 and the viewing window cover flap have completely effected the light-tight covering of the film before the shutter blades start to open for the purpose of subsequent viewing through the finder upon completion of the exposure.

Owing to the organization provided by the invention, the photographer need not observe any operating rules to obtain an undisturbed running down of the exposure driving mechanism. On the contrary, having overcome the "pressure point," i.e., having initially actuated the camera release 4, the operator is now completely free insofar as influencing the exposure is concerned. Regardless of whether the operator removes his finger from the camera release button 4 quickly or slowly and regardless of the exposure time chosen, especially if it is a very long exposure the arrangement according to the invention insures that the operation required to effect the proper exposure takes place successively and automatically, at all times accurately to carry out the neecssary sequence of operations.

2. *The Taking of Photographs by Means of a Delayed Action Mechanism*

The statements made under (1) above are fully applicable to photographs utilizing a delayed action mechanism. There is, however, only one difference, namely, that the running down of the shutter driving mechanism does not take place immediately after the locking means for the actuating devices has become operative, but instead the running down of the delayed action mechanism is inserted between the moment that the locking means becomes operative and the start of movement of the shutter driving mechanism by which the shutter blades are opened for the exposure.

In this case, also, the operator may take his finger off the camera release button 4 immediately after having overcome the additional pressure point, i.e., after the release of the delayed action mechanism, since the actuating devices remain in the shifted positions which exist at the moment of release, i.e., positions wherein the camera is in readiness for the actual exposure of the film, both during the running time of the delayed action mechanism and during the entire running off period of the shutter driving mechanism which effects the actual exposure. Thus, having effected the initial release, the operator is completely free in his actions.

The positive uni-directional, tensional connection as provided by the invention between the camera release button 4 and the listed actuating devices, in conjunction with the abovementioned locking or detent device, has the effect that the camera release 4 and the shutter release 7 are able to return to their starting positions at any moment whatsoever after the initial release has been effected, while at the same time the arrangement reliably insures the return movement of the actuating devices to restore the viewing components to their initial positions only after thet actual exposure of the film has been completed.

3. *Taking of Photographs Utilizing a "B" Setting*

The release process for the effecting of B-exposures is the same as already described above. However, owing to the B-setting position of the exposure time setting member (not shown), the lever 30 now becomes operative and locks the main driving disc 16 in a position corresponding to the open position of the shutter blades as long as pressure is maintained on the camera release button 4.

Removing of pressure from the camera release button 4 sets free the shutter release 7 which, under the action of its spring 44 follows the lever 6 connected to the camera release button 4. When the shutter release 7 reaches its inoperative or idle position as shown in FIG. 5, the lever 30 is pivoted completely out of the path of movement of the main driving disc 16 so that the latter is now able to continue and complete its movement clockwise, to effect closure of the shutter blades and completion of the exposure. Only then are the actuating devices released so that they may be returned under the action of the respective spring to their starting or viewing positions as described above.

I claim:

1. In a one-eye mirror reflex camera having a housed intra-lens shutter assemblage with shutter driving mechanism, having actuating devices, including an auxiliary shutter actuating device, which are shifted in response to operation of the camera release to close the shutter blades and to shift the finder mirror out of viewing position, and having means for thereafter causing release of the shutter driving mechanism for effecting an exposure, the improvement which comprises tensional, unidirectionally positive, separable driving connections carried by the camera and connected between the said camera release on the one hand and the said mirror actuating and auxiliary shutter actuating devices on the other hand to drive said devices by movement of the camera release; and releasable locking means on the camera for automatically holding the said mirror actuating and auxiliary shutter actuating devices in their respective shifted positions until completion of the said exposure, said locking means being responsive to and rendered inoperative by operation of said shutter driving mechanism to release the said two actuating devices upon said completion of exposure.

2. The invention as defined in claim 1, in which there is a single transmission means connected with the camera release for operation thereby, said transmission means operating the said actuating devices.

3. The invention as defined in claim 2, in which there is a shutter release member for effecting release of the shutter driving mechanism, said member being actuated by the camera release and having a driving portion engaged with the transmission means to operate the latter.

4. The invention as defined in claim 3, in which the shutter release member and transmission means are pivotally movable and coaxial.

5. The invention as defined in claim 2, in which the locking means comprises a device disposed within the housing for the intra-lens shutter assembly and engageable with the said transmission means.

References Cited in the file of this patent

UNITED STATES PATENTS

| | | |
|---|---|---|
| 2,579,247 | Angenieux | Dec. 18, 1951 |
| 2,730,025 | Faulhaber | Jan. 10, 1956 |